United States Patent [19]
Hankawa et al.

[11] Patent Number: 5,850,311
[45] Date of Patent: Dec. 15, 1998

[54] EYEPIECE SYSTEM

[75] Inventors: Masashi Hankawa, Kanagawa-ken; Tomoko Sato, Hachioji, both of Japan

[73] Assignee: Olympus Optical Co., Ltd., Tokyo, Japan

[21] Appl. No.: 714,256

[22] Filed: Sep. 17, 1996

[30] Foreign Application Priority Data

Dec. 7, 1995 [JP] Japan ..................... 7-344728
Apr. 16, 1996 [JP] Japan ..................... 8-117115

[51] Int. Cl.$^6$ ............ G02B 25/00; G02B 21/02; G02B 3/02; G02B 9/14
[52] U.S. Cl. ............ 359/644; 359/643; 359/656; 359/715; 359/716; 359/774; 359/787
[58] Field of Search ............... 359/643–647, 359/716, 785, 787, 656, 722, 774, 715

[56] References Cited

U.S. PATENT DOCUMENTS 3,975,088  8/1976  Shoemaker ............... 359/645
5,619,379  4/1997  Fukumoto ............... 359/644
5,691,850  11/1997  Arisaka ............... 359/644
5,701,475  12/1997  Sugawara ............... 359/645

FOREIGN PATENT DOCUMENTS 49-020552  5/1974  Japan .
54-044458  12/1979  Japan .
55-024084  6/1980  Japan .
07281108  10/1995  Japan .
07311351  11/1995  Japan .

Primary Examiner—Georgia Y. Epps
Assistant Examiner—Evelyn A. Lester
Attorney, Agent, or Firm—Pillsbury Madison & Sutro LLP

[57] ABSTRACT

An eyepiece system which is configured for observing an image formed by an objective lens system and comprises, in order from a side, of the objective lens system, a first lens element having at least one aspherical surface and a concave surface on the side of the objective lens system, at least one biconcave lens element and at least one positive lens element.

15 Claims, 2 Drawing Sheets

EYEPIECE SYSTEM

BACKGROUND OF THE INVENTION a) Field of the Invention

The present invention relates to a compact eyepiece system which has a wide field angle of 60° or larger and is to be used with binoculars and so on.

b) Description of the Prior Art

Conventional wide-angle eyepiece systems which have apparent field angles of 60° and larger are composed of large numbers of lens elements for favorably correcting aberrations. Lens systems disclosed by Japanese Patents Kokoku Publication No. Sho 55-24084 and No. Sho 49-20552 are known as conventional eyepiece systems, each composed of four or a smaller number of lens elements. Out of these conventional eyepiece systems, an embodiment of Japanese Patent Kokoku Publication No. Sho 55-24084 has an eye point located at a distance of 0.814 f to 0.815 f.

Further, a lens system disclosed by Japanese Patent Kokoku Publication No. Sho 54-44458 is known as another conventional example of an eyepiece system having an apparent field angle of 60°. Though this conventional example is an eyepiece system which has an apparent field angle of 60° to 50°, the patent specification describes an embodiment of the eyepiece system which has a field angle of 60° and an eye point located at a short distance of 0.795 f, and is composed of four lens components of five lens elements.

Furthermore, lens systems which are used in various fields of application adopt aspherical surfaces effectively for enhancing optical performance and reducing numbers of lens elements.

Moreover, lens elements which are made of synthetic resin optical materials are conventionally used for reducing manufacturing costs of camera viewfinder in particular in observation optical systems.

When an eyepiece system is composed of a large number of lens elements for securing favorable performance even at marginal portions of a visual field, it not only requires increased manufacturing cost due to the large number of lens elements, but also has an increased total length due to the large number of lens elements. Such an eyepiece system can hardly be compact and manufactured at a low cost.

An eyepiece system which has a wide apparent field angle tends to produce remarkable aberrations in a pupil thereof, thereby tending to produce a phenomenon which extremely lowers a light intensity partially in a visual field.

Each of the above-mentioned conventional examples, i.e., the eyepiece system disclosed by Japanese Patent Kokoku Publication No. Sho 55-24084 or No. Sho 49-20552 which is composed of the four or a, smaller number of lens elements, has a defect that astigmatic difference is remarkable at marginal portions of a visual field. Further, conventional examples proposed by Japanese Patents Kokai Publication No. Hei 7-281108 and No. Hei 7-311351 take astigmatic difference into consideration but pay no particular attention to compactness of optical systems including objective lens systems. These patents make no disclosure of chromatic aberration or manufacturing costs. Furthermore, a conventional example proposed by Japanese Patent Kokoku Publication No. Sho 55-24084 has an eye point located at an insufficient distance.

In addition, sufficient reduction of manufacturing costs has not yet been achieved for optical systems which have observing magnifications exceeding 2× and observation field angles exceeding 50° due to a fact that these optical systems require high optical performance for favorable correction of spherical aberration, astigmatism, coma, etc. as well as strict precisions for the lens surfaces. Though lens elements are configured so as to have shapes which are substantially the same as those of plane parallel plates and made of synthetic resin materials for obtaining lens elements having high surface precision, these lens elements have no sufficient aberration correcting capabilities and cannot sufficiently reduce manufacturing costs of eyepiece systems.

It is conceivable to strengthen the power of an eyepiece system for obtaining a compact eyepiece system which has a wide field angle. When a power of an eyepiece system is strengthened, however, the lens system has an eye point at a shorter distance. For correcting this defect, it is necessary to displace a principal point on a side of an observer's eye as far as toward the eye. When the eye side principal point is displaced toward the eye side, however, a principal point on a side of an objective lens system is also displaced toward the eye side. When the principal point on the side of the objective lens system is located close to the eye, an intermediate image surface is brought close to or inside an eyepiece system. In such a case, a flaw or dust on a lens surface is magnified by the eyepiece system and is conspicuous in the visual field.

It is conceivable to reserve a long distance between the principal point on the eye side and the principal point on the side of the objective lens system by using a larger number of lens elements. When a larger number of lens elements are used, however, the eyepiece system cannot be compact and requires a high manufacturing cost.

There is no conventional eyepiece system which has a wide visual field, a compact size, an eye point located at a sufficient distance, and a sufficient distance between the eyepiece system and an intermediate image surface thereof.

SUMMARY OF THE INVENTION

A primary object of the present invention is to provide an eyepiece system which has a wide apparent field angle of at least 60°, permits observing a favorable image of an object over an entire range of an image plane, can be composed of a small number of lens elements, enables one to configure observation optical systems that are compact including objective lens systems and can be manufactured at a low cost.

Another object of the present invention is to provide an eyepiece system which is compact, has an eye point located at a sufficient distance and a sufficient distance between the eyepiece system and an intermediate image surface and favorably corrects aberrations.

The eyepiece system according to the present invention is characterized in that it comprises, in order from a side of an objective lens system, a first lens element having a concave surface on the side of the objective lens system, at least one negative lens element and at least one positive lens element.

DETAILED DESCRIPTION OF THE PREFERRED EMBODIMENTS

Figure 1:
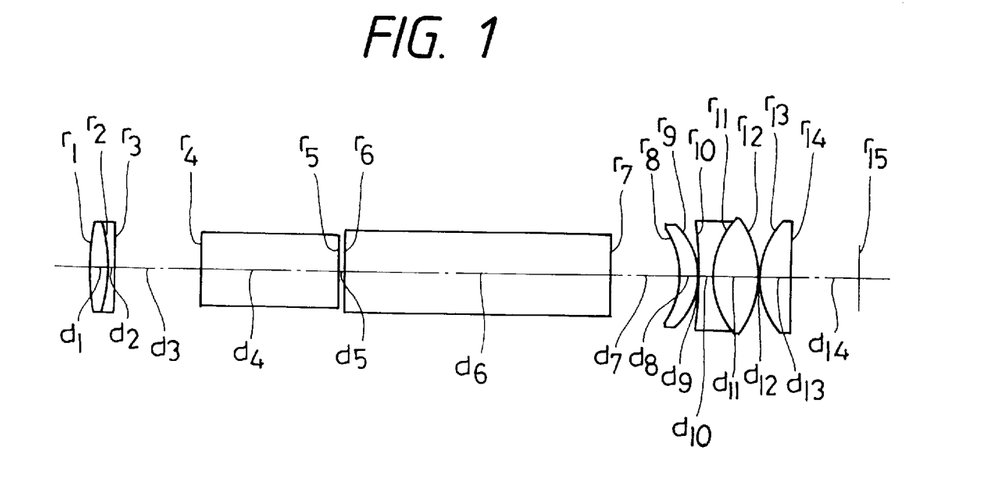
FIG. 1 shows a sectional view illustrating a composition of a first embodiment of the eyepiece system according to the present invention.

The eyepiece system according to the present invention has a composition illustrated, for example, in FIG. 1, or is characterized in that it comprises, in order from a side of an objective lens system, a first lens element having a concave surface on the side of the objective lens system, at least one negative lens element and at least one positive lens element.

In FIG. 1, the reference symbols $r_1$ through $r_3$ represent the objective lens system and the reference symbols $r_8$ through $r_{14}$ designate the eyepiece system according to the present invention.

The eyepiece system according to the present invention has the composition described above, uses an aspherical surface on the first lens element for preventing, as far as possible, abrupt divergence of astigmatic difference at marginal portions of a visual field which is apt to be produced in an eyepiece system having a wide visual field, has favorable resolving performance obtained with a small number of lens elements and can be manufactured at a low cost. Further, coma is scarecely influenced by manufacturing errors of surfaces of the first lens element since it is disposed closest to a primary image surface.

For configuring an optical system which has a short total length, it is necessary to strengthen a power of an objective lens system, and that of an eyepiece system respectively. When an eyepiece system which is composed of a small number of lens elements and has a wide visual field has a strong power, it is necessary to strongly refract a light bundle having a large field angle, whereby aberrations of high orders are apt to be produced.

Production of aberrations of high orders can be prevented by configuring the first lens element so as to have a concave surface on the side of the objective lens system. Speaking concretely, a diverging light bundle is incident on an eyepiece system and a principal ray has such an angle as to direct it away from an optical axis. In an optical system which has a wide visual field, in particular, a principal ray of a light bundle having a large field angle is away from the optical axis at a large angle. When the first lens element has a convex surface on the side of the objective lens system, rays are incident high and at large angles on the first lens element, whereby aberrations of high orders are undesirably produced as described above. By configuring the first lens element so as to have a concave surface on the side of the objective lens system as described above, it is possible to lower the incident rays and reduce the angles of incidence thereof on the first lens element, thereby reducing amounts of aberrations of high orders. Further, by using an aspherical surface on either side of the first lens element, it is possible to produce aberrations of high orders which are desirable for correction of aberrations including those of high orders produced by other lens elements or securing favorable performance of the eyepiece system as a whole.

Lateral chromatic aberration, in particular, can be corrected by disposing a negative lens element in an eyepiece system. By disposing at least one negative lens element having a biconcave shape, it is possible to reduce the power per surface and correct chromatic aberration in an eyepiece system having a strong power with a small number of negative lens elements. In addition, the composition described above makes it possible to dispose a negative lens element having a strong power, thereby facilitating adopting inexpensive materials such as synthetic resins, though these materials can hardly have low dispersing powers.

When the first lens element is configured as a meniscus lens element having a concave surface on the side of the objective lens system and the second lens element is configured so as to have a concave surface on the side of the objective lens system, it is easy to control production of aberrations of high orders with an air lens formed between the first lens element and the second lens element, and it is possible to reserve a narrow airspace between the first lens element and the second lens element, thereby obtaining an effect for configuring compact optical systems.

By configuring the first lens element so as to have a positive refractive power, it is possible to narrow an angle at which the principal ray of the light bundle having a large field angle is away from the optical axis and lower heights of rays incident on a lens system disposed on the eye side of the first lens element. By narrowing the angle or lowering heights of rays, it is possible to obtain an effect for permitting configuring a compact eyepiece system which is apt to be enlarged as it has a wide visual field and another effect for lessening a burden on the negative lens element which must have a strong refractive power for correcting chromatic aberration in particular.

Further, it is desirable to configure the first lens element so as to satisfy the following condition (1):

(1) $N_{d1} < 1.6$, $62 > \upsilon_{d1} > 54$ wherein the reference symbol $N_{d1}$ represents a refractive index of the first lens element and the reference symbol $\upsilon_{d1}$ designates an Abbe's number of the first lens element.

Since rays are incident high on lens elements which are disposed on the eye side of the first lens elements, it is desirable to make these lens elements of a material having a high refractive index. However, a value of $N_{d1}$ exceeding 1.6 is undesirable since it is impossible to obtain a material such as a synthetic resin which can be molded at a low cost and has such a high refractive index. If $\upsilon_{d1}$ has a value smaller than 54, a heavy burden will undesirably be imposed on the negative lens element for correcting chromatic aberration. A value of $\upsilon_{d1}$ exceeding 62 is undesirable since it is impossible to obtain a material such as a synthetic resin which can be molded at a low cost and has such a large Abbe's number.

Furthermore, it is desirable that the eyepiece system according to the present invention comprises, in addition to the first lens element, a second lens element having a negative refractive power, a third biconvex lens element which is cemented to the second lens element so as to compose a cemented lens component, and a fourth lens element which has a positive refractive power and a convex surface having higher curvature on the side of the objective lens system.

Mainly lateral chromatic aberration can be corrected favorably by cementing the second lens element to the third lens element so as to compose a cemented lens component, and astigmatic difference can be corrected by using the third lens element which is configured as the biconvex lens element having a strong positive refractive power. Further, it is desirable that the fourth lens element which is disposed at a location closer to an eye point has a convex surface having higher curvature on the side of the objective lens system so that it smoothly refracts rays, or produces aberrations in small amounts.

It is desirable that the eyepiece system according to the present invention satisfies the following condition (2):

(2) $2.0 < f_{123}/f_E < 4.0$ wherein the reference symbol $f_{123}$ represents a total focal length of the first lens element, the second lens element and the third lens element, and the reference symbol $f_E$ designates a focal length of the eyepiece system as a whole.

If the lower limit of 2.0 of the condition (2) is exceeded, the positive refractive powers of the first lens element and the third lens element will be strengthened, whereas the negative refractive power of the second lens element will be weakened, thereby making it difficult to correct lateral chromatic aberration and other aberrations. If the upper limit of 4.0 of the condition (2) is exceeded, in contrast, the positive refractive power of the fourth lens element will be strengthened, thereby making it difficult to correct aberrations and the fourth lens unit will have high curvature, thereby making it difficult to reserve sufficient marginal thickness or posing a problem from a viewpoint of workability or productivity.

It is desirable to configure the aspherical surface of the first lens element so as to have a shape which strengthens a negative refractive power in a direction from a center toward a marginal portion of the lens element. By configuring the first lens element so as to have such an aspherical surface, it is possible to control astigmatism and distortion so as to obtain an image which is favorable even at marginal portions.

The eyepiece system according to the present invention comprises a lens element which is disposed on the side of the objective lens system, has a positive refractive power and is made of a synthetic resin optical material; and is used in an optical system which is used for observing, through an eyepiece system, a magnified image of an object formed (at a location referred to as an intermediate image surface) by an objective lens system and satisfies the following condition (3):

(3) $2 < f_O/f_E$ wherein the reference symbol $f_O$ represents a focal length of the objective lens system and the reference symbol $f_E$ designates a focal length of the eyepiece system.

The condition (3) defines an observing magnification. If the condition (3) is not satisfied, utility of the magnified observation optical system will be degraded.

Influences on spherical aberration and coma, in particular, due to working errors of shapes of lens surfaces are reduced by disposing the lens element made of the synthetic resin optical material in the vicinity of the intermediate image surface. This is because each of the light bundles emitted from a surface of an object is incident as a thin light bundle on the lens element which is disposed in the vicinity of the intermediate image surface and made of the synthetic resin optical material since an observing light bundle is condensed once onto a point on the intermediate image surface and then diverges therefrom.

Accordingly, surfaces of the lens element made of the synthetic resin optical material can easily be shaped even when the eyepiece system is to be used in a magnified observation optical system or a wide-field optical system having a field angle exceeding 60° since it is sufficient to shape surfaces of the lens element made of the synthetic resin optical material with a precision high enough for correction of astigmatism, etc.

Further, it is required to correct chromatic aberration to a low level in an eyepiece system which is to be used in a magnified observation optical systems or wide-field observation optical systems. It is therefore desirable to dispose a negative lens element having a strong refractive power in an eyepiece system having a wide visual field. It is desirable to configure this negative lens element so as to satisfy the following condition (4):

(4) $n_N > 1.65$, $v_N < 40$

It is desirable that the eyepiece system according to the present invention comprises at least one negative lens element configured to satisfy the above-mentioned condition since such a negative lens element makes it possible to reduce an amount of lateral chromatic aberration to be produced and correct astigmatism favorably even at marginal portions of a visual field.

For correcting coma, etc., it is desirable to dispose a positive lens element on the eye side of the negative lens element mentioned above.

Moreover, it is desirable to apply a coating having an antistatic effect to an object side surface of the lens element made of the synthetic resin optical material at least within a range through which a light bundle passes. When dust or foreign matter adheres to the lens element which is disposed in the vicinity of the intermediate image surface and made of a synthetic resin optical material, its image may be overlapped with an image of an object to be observed.

Out of synthetic resin optical materials, polyorefin and others are easily charged and allow adhesion of dust. A surface of the eyepiece system which is located on the side of the objective lens system is disposed close to the intermediate imaging surface. Since this surface is not shielded from outside with a lens barrel, etc. unlike surfaces disposed inside the eyepiece system, dust is apt to adhere to it. By applying a coating having an antistatic effect to this surface, it is therefore possible to lower the possibility of dust adhering to it, thereby reducing influences on legibility due to dust. It is desirable not to apply the coating to an outside of the range through which a light bundle passes so that floating dust easily adheres to areas free from influences on an image. Further, it is desirable for composing a magnified observation optical system to impart an antireflection effect to the coating having antistatic effect.

The lens element which is disposed closest to the intermediate imaging surface and made of a synthetic resin optical material may have an external shape having a vertical size and a horizontal size different from each other.

It is demanded these days to compose optical instruments for magnified observation such as binoculars so as to have external designs which are compact and suited for facilitated use. These demands cannot be sufficiently met by the conventional compositions which use lens elements having the circular external shapes and lens barrels for holding the lens elements having the circular external shapes. On the other hand, problems such as manufacturing costs and difficulties obtaining high precision are posed by forming lens elements made of glass materials so as to have external shapes having vertical sizes and horizontal sizes different from each other. Lens elements which are made of synthetic resin optical materials, in contrast, can be formed relatively freely so as to have any external shapes since the synthetic resin optical materials can be molded with dies. For facilitating assembly, in particular, it is preferable that a lens element to be disposed at a location outside the eyepiece system can be formed so as to have an optional shape.

Further, it is demanded these days to design visual fields having horizontal sizes and vertical sizes different from each other so that they are matched with man's visual field. For meeting this demand, a range allowing passage of a light bundle must have a vertical size and a horizontal size which are different from each other on a surface of an eyepiece system which is disposed on the side of the objective lens system. For coping with such a range and configuring a compact eyepiece system, it is effective to configure the lens element so as to have a vertical size and a horizontal size which are different from each other. For this reason, it is desirable to select a synthetic resin optical material for the lens element to be disposed in the eyepiece system at the location on the side of the objective lens system.

A lens element which is made of a synthetic resin optical material is suited for forming an aspherical surface thereon. The present invention provides a remarkable effect by enhancing freedom of correction of aberrations with an aspherical surface formed on a lens element made of a synthetic resin optical material.

Furthermore, it is desirable that the eyepiece system according to the present invention satisfies the following condition (5):

(5) $0 \leq L/f_E \leq 0.41$ wherein the reference symbol L represents a distance as measured from the intermediate image surface to the surface, located on the side of the objective lens system, of the first lens element.

If $L/f_E$ has a value smaller than the lower limit of 0 of the condition (5), the eyepiece system cannot have sufficient performance. If $L/f_E$ has a value larger than the upper limit of 0.41 of the condition (5), a distance between the aspherical surface and the intermediate image surface will be too long for configuring the eyepiece system to be compact. Further, the aspherical surface will undesirably require a strict manufacturing allowance.

The eyepiece system according to the present invention is composed, in order from the side of the objective lens system, of a positive meniscus lens element having a convex surface on the eye side (having a concave surface on the side of the objective lens system), a cemented lens component consisting of a biconcave lens element and a biconvex lens element, a convex lens element; and satisfies the following condition (6):

(6) $0.1 < f_E/|r_{n1}| < 1.5$ wherein the reference symbol $r_{n1}$ represents a radius of curvature on a surface of the biconcave lens element which is located on the side of the objective lens system.

For obtaining a compact eyepiece system which has a wide visual field like that according to the present invention, it is required to strengthen a power of the eyepiece system. In such a case, however, the eyepiece has an eye point located at a short distance. For preventing the eye point from being located at such a short distance, it is necessary to displace a front principal point toward the eye side as far as possible. However, such displacement of the front principal point results in displacement also of a rear principal point toward the eye side. When the rear principal point is displaced toward the eye side, the intermediate image surface is undesirably brought near or into the eyepiece system.

The present invention locates the eyepiece system apart from the intermediate image surface by composing the eyepiece system of the positive meniscus lens element having the convex surface on the eye side, the cemented lens component consisting of the biconcave lens element and the biconvex lens element, and the convex lens element; and configures the eyepiece system so as to satisfy the above-mentioned condition (6).

It is possible to configure an eyepiece system compactly by disposing a convex lens element on the eye side therein so that a light bundle which is made divergent for obtaining a wide visual field is abruptly refracted at a location in the vicinity of the eye.

Lateral chromatic aberration can be favorably corrected by using the cemented lens component consisting of the biconcave lens element and the biconvex lens element. Further, it is possible to locate the intermediate image surface apart from the eyepiece system by selecting radius of curvature $r_{n1}$ having an adequate value which satisfies the condition (6) for the surface of the biconcave lens element of the cemented lens component which is located on the side of the objective lens system.

By disposing the positive lens element on the side of the objective lens system, it is possible to lower heights of rays incident on the lens elements disposed on the eye side of the positive lens element, thereby enabling one to configure a compact eyepiece system which is apt to be enlarged when it has a wide visual field. Further, by configuring the positive lens element to be disposed on the object side as a meniscus lens element having the concave surface on the side of the objective lens system or a convex surface on the eye side, it is possible to reduce angles of incidence without enhancing heights of rays incident from the side of the objective lens system, thereby reducing aberrations of high orders. Further, it is easy to control production of aberrations of high orders owing to an effect obtained with an air lens formed between the eye side convex surface of the positive meniscus lens element and the biconcave lens element of the cemented lens component. Moreover, an airspace reserved between the positive meniscus lens element and the biconcave lens element can be narrowed for obtaining an advantage for configuring the eyepiece system compact. It is desirable that the biconcave lens element satisfies the above-mentioned condition (6).

The above-mentioned condition (6) defines a radius of curvature on a surface of the biconcave lens element which is disposed on the side of the objective lens system. This condition is required for locating the intermediate image surface apart from the eyepiece system. If the upper limit of 1.5 of the condition (6) is exceeded, the principal point on the side of the objective lens system will be displaced toward the eye side, whereby the intermediate image surface will be too close to the eyepiece system. If the lower limit of 0.1 of the condition (6) is exceeded, in contrast, it will be difficult to correct lateral chromatic aberration.

Further, it is desirable that the biconcave lens element of the cemented lens component satisfies the following condition (7):

(7) $0.4 < f_E/|r_{n1}| + f_E/|r_{n2}| < 1.75$ wherein the reference symbol $r_{n2}$ represents a radius of curvature on the eye side surface of the biconcave lens element.

The condition (7) defines radii of curvature on both the surfaces of the biconcave lens element of the cemented lens component. This condition is required for correcting lateral chromatic aberration and reserving sufficient marginal thickness of the biconvex lens element of the cemented lens component. If the lower limit of 0.4 of the condition (7) is exceeded, lateral chromatic aberration will be aggravated. If the upper limit of 1.75 of the condition (7) is exceeded, the biconcave lens element will have a strong power and rays will be incident high on the biconvex lens element, thereby making it impossible to reserve sufficient marginal thickness.

When the eyepiece system may have a magnification which is not so high, it is possible to locate an eye point at a sufficiently long distance while keeping the intermediate image surface apart from the eyepiece system and favorably correcting aberrations by satisfying, in place of the conditions (6) and (7), the following conditions (6-1) and (7-1):

(6-1) $0.15 < f_E/|r_{n1}| < 0.5$ (7-1) $0.7 < f_E/|r_{n1}| + f_E/|r_{n2}| < 1.2$

When a power of the eyepiece system is to be strengthened for enhancing a magnification thereof, it is desirable to satisfy, in place of the conditions (6-1) and (7-1), the following conditions (6-2) and (7-2):

(6-2) $0.4 < f_E/|r_{n1}| < 1.2$ (7-2) $1.1 < f_E/|r_{n1}| + f_E/|r_{n2}| < 1.67$

When the eyepiece system is to have a high magnification, it is desirable that the surface of the biconcave lens element of the cemented lens component which is disposed on the side of the objective lens system has a radius of curvature satisfying the following condition (6-3):

(6-3) $0.61 < f_E/|r_{n1}| < 1.0$

When the power of the eyepiece system is strengthened for enhancing a magnification thereof, it is desirable to satisfy the condition (6-3) in place of the condition (6-2). Speaking concretely, it is possible to prevent the intermediate image surface from being brought close to the eyepiece system by selecting, for $f_E/|r_{n1}|$, a value which is smaller than the upper limit of 1.0 of the condition (6-3). Further, it is possible to correct lateral chromatic aberration favorably over the entire range of a wide visual field by selecting, for $f_E/|r_{n1}|$, a value which is larger than the lower limit of 0.61 of the condition (6-3).

Figure 2:
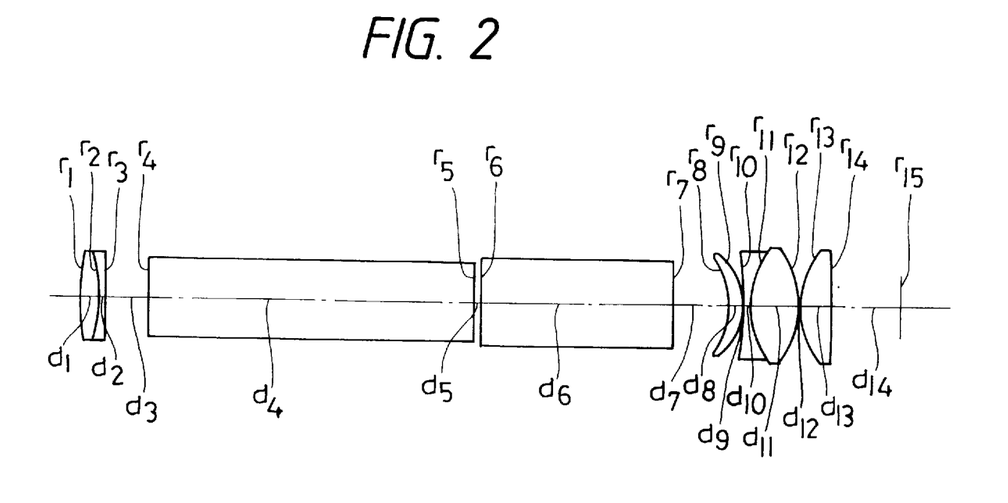
FIG. 2 shows a sectional view illustrating a composition of a second embodiment of the eyepiece system according to the present invention.

Embodiments of the eyepiece system according to the present invention including an objective lens system have compositions illustrated in FIG. 1 through FIG. 3 and numerical data which is listed below:

Embodiment 1

| | | | |
|---|---|---|---|
| $r_1 = 37.3688$ | | | |
| | $d_1 = 2.7190$ | $n_1 = 1.56883$ | $v_1 = 56.33$ |
| $r_2 = -23.8044$ | | | |
| | $d_2 = 1.0000$ | $n_2 = 1.62004$ | $v_2 = 36.26$ |
| $r_3 = -236.9744$ | | | |
| | $d_3 = 13.0913$ | | |
| $r_4 = \infty$ | | | |
| | $d_4 = 21.0700$ | $n_3 = 1.56883$ | $v_3 = 56.33$ |
| $r_5 = \infty$ | | | |
| | $d_5 = 0.6000$ | | |
| $r_6 = \infty$ | | | |
| | $d_6 = 40.6900$ | $n_4 = 1.51633$ | $v_4 = 64.15$ |
| $r_7 = \infty$ | | | |
| | $d_7 = 10.4493$ | | |
| $r_8 = -14.9622$ (aspherical surface) | | | |
| | $d_8 = 2.7000$ | $n_5 = 1.49241$ | $v_5 = 57.66$ |
| $r_9 = -10.4941$ | | | |
| | $d_9 = 0.2000$ | | |
| $r_{10} = -52.5020$ | | | |
| | $d_{10} = 2.1019$ | $n_6 = 1.84666$ | $v_6 = 23.78$ |
| $r_{11} = 13.1319$ | | | |
| | $d_{11} = 6.9488$ | $n_7 = 1.61800$ | $v_7 = 63.39$ |
| $r_{12} = -14.1389$ | | | |
| | $d_{12} = 0.2000$ | | |
| $r_{13} = 12.4218$ | | | |
| | $d_{13} = 4.5297$ | $n_8 = 1.71300$ | $v_8 = 53.84$ |
| $r_{14} = 310.2405$ | | | |
| | $d_{14} = 10.6079$ | | |
| $r_{15} = \infty$ (eye point) | | | |

Embodiment 1 (continued)

aspherical surface coefficients (8th surface)

$K = 0$, $E = -8.0346 \times 10^{-5}$, $F = -2.2511 \times 10^{-6}$,
$G = 3.5315 \times 10^{-8}$
$f_{123}/f_E = 3.02$, $f_O/f_E = 6.00$, $L/f_E = 0.26$

Embodiment 2

| | | | |
|---|---|---|---|
| $r_1 = 37.4845$ | | | |
| | $d_1 = 2.8235$ | $n_1 = 1.57135$ | $v_1 = 52.96$ |
| $r_2 = -24.2702$ | | | |
| | $d_2 = 1.0000$ | $n_2 = 1.62004$ | $v_2 = 36.26$ |
| $r_3 = -287.2865$ | | | |
| | $d_3 = 6.5689$ | | |
| $r_4 = \infty$ | | | |
| | $d_4 = 49.5235$ | $n_3 = 1.51633$ | $v_3 = 64.15$ |
| $r_5 = \infty$ | | | |
| | $d_5 = 0.6000$ | | |
| $r_6 = \infty$ | | | |
| | $d_6 = 29.5403$ | $n_4 = 1.64769$ | $v_4 = 33.80$ |
| $r_7 = \infty$ | | | |
| | $d_7 = 8.5000$ | | |
| $r_8 = -15.3686$ (aspherical surface) | | | |
| | $d_8 = 2.0677$ | $n_5 = 1.49241$ | $v_5 = 57.66$ |
| $r_9 = -10.1010$ | | | |
| | $d_9 = 0.2000$ | | |
| $r_{10} = -48.0601$ | | | |
| | $d_{10} = 1.0000$ | $n_6 = 1.84666$ | $v_6 = 23.78$ |
| $r_{11} = 14.6216$ | | | |
| | $d_{11} = 7.3598$ | $n_7 = 1.60311$ | $v_7 = 60.68$ |
| $r_{12} = -14.6216$ | | | |
| | $d_{12} = 0.2000$ | | |
| $r_{13} = 13.4666$ | | | |
| | $d_{13} = 4.8310$ | $n_8 = 1.72916$ | $v_8 = 54.68$ |
| $r_{14} = -305.5387$ | | | |
| | $d_{14} = 10.5000$ | | |
| $r_{15} = \infty$ (eye point) | | | | aspherical surface coefficients (8th surface)

$K = 0$, $E = -2.6075 \times 10^{-4}$, $F = 4.3460 \times 10^{-6}$,
$G = -7.1325 \times 10^{-8}$, $H = 6.0172 \times 10^{-10}$
$f_{123}/f_E = 3.12$, $f_O/f_E = 5.95$, $L/f_E = 0.322$

Embodiment 3

| | | | |
|---|---|---|---|
| $r_1 = 42.795$ | | | |
| | $d_1 = 3.17$ | $n_1 = 1.57135$ | $v_1 = 52.96$ |
| $r_2 = -30.385$ | | | |
| | $d_2 = 1.20$ | $n_2 = 1.63980$ | $v_2 = 34.48$ |
| $r_3 = -206.324$ | | | |
| | $d_3 = 4.53$ | | |
| $r_4 = \infty$ | | | |
| | $d_4 = 52.13$ | $n_3 = 1.51633$ | $v_3 = 64.15$ |
| $r_5 = \infty$ | | | |
| | $d_5 = 0.6$ | | |
| $r_6 = \infty$ | | | |
| | $d_6 = 29.54$ | $n_4 = 1.64769$ | $v_4 = 33.80$ |
| $r_7 = \infty$ | | | |
| | $d_7 = 12.2$ | | |
| $r_8 = -16.460$ (aspherical surface) | | | |
| | $d_8 = 2.56$ | $n_5 = 1.49241$ | $v_5 = 57.66$ |
| $r_9 = -6.607$ | | | |
| | $d_9 = 0.20$ | | |
| $r_{10} = -11.03$ | | | |
| | $d_{10} = 1.00$ | $n_6 = 1.84666$ | $v_6 = 23.78$ |
| $r_{11} = 18.636$ | | | |
| | $d_{11} = 6.97$ | $n_7 = 1.60311$ | $v_7 = 60.68$ |
| $r_{12} = -9.700$ | | | |
| | $d_{12} = 0.20$ | | |
| $r_{13} = 11.69$ | | | |
| | $d_{13} = 3.70$ | $n_8 = 1.72916$ | $v_8 = 54.68$ |

-continued

Embodiment 3

$r_{14} = \infty$
$\quad d_{14} = 9.00$
$r_{15} = \infty$ (eye point)

aspherical surface coefficients (8th surface)

$K = 0, E = 0.92275 \times 10^{-3}, F = 0.28350 \times 10^{-14}$
$G = 0.83634 \times 10^{-6},$
$f_E/|r_{n1}| = 0.82, f_E/|r_{n1}| + f_E/|r_{n2}| = 1.30$
$f_{123}/f_E = 3.38, f_0/f_E = 7.82, L/f_E = 0.17$

Embodiment 4

$r_1 = 42.710$
$\quad d_1 = 3.17 \quad n_1 = 1.57135 \quad v_1 = 52.96$
$r_2 = -30.347$
$\quad d_2 = 1.20 \quad n_2 = 1.63980 \quad v_2 = 34.48$
$r_3 = -207.950$
$\quad d_3 = 4.51$
$r_4 = \infty$
$\quad d_4 = 52.13 \quad n_3 = 1.51633 \quad v_3 = 64.15$
$r_5 = \infty$
$\quad d_5 = 0.6$
$r_6 = \infty$
$\quad d_6 = 29.54 \quad n_4 = 1.64769 \quad v_4 = 33.80$
$r_7 = \infty$
$\quad d_7 = 12.24$
$r_8 = -15.762$ (aspherical surface)
$\quad d_8 = 2.39 \quad n_5 = 1.49241 \quad v_5 = 57.66$
$r_9 = -6.743$
$\quad d_9 = 0.20$
$r_{10} = -11.605$
$\quad d_{10} = 1.00 \quad n_6 = 1.84666 \quad v_6 = 23.78$
$r_{11} = 16.849$
$\quad d_{11} = 7.11 \quad n_7 = 1.60311 \quad v_7 = 60.68$
$r_{12} = -9.745$
$\quad d_{12} = 0.20$
$r_{13} = 11.692$
$\quad d_{13} = 3.70 \quad n_8 = 1.72916 \quad v_8 = 54.68$
$r_{14} = \infty$
$\quad d_{14} = 9.00$
$r_{15} = \infty$ (eye point)

aspherical surface coefficients (8th surface)

$K = 0, E = 0.77659 \times 10^{-3}, F = 0.17191 \times 10^{-4},$
$G = 0.56171 \times 10^{-6}$
$f_E/|r_{n1}| = 0.78, f_E/|r_{n1}| + f_E/|r_{n2}| = 1.32$
$f_{123}/f_E = 3.43, f_0/f_E = 7.80, L/f_E = 0.17$

Embodiment 5

$r_1 = 40.826$
$\quad d_1 = 3.17 \quad n_1 = 1.57135 \quad v_1 = 52.96$
$r_2 = -30.834$
$\quad d_2 = 1.20 \quad n_2 = 1.63980 \quad v_2 = 34.48$
$r_3 = -265.902$
$\quad d_3 = 4.51$
$r_4 = \infty$
$\quad d_4 = 52.13 \quad n_3 = 1.51633 \quad v_3 = 64.15$
$r_5 = \infty$
$\quad d_5 = 0.6$
$r_6 = \infty$
$\quad d_6 = 29.54 \quad n_4 = 1.64769 \quad v_4 = 33.80$
$r_7 = \infty$
$\quad d_7 = 12.24$
$r_8 = -19.025$ (aspherical surface)
$\quad d_8 = 2.29 \quad n_5 = 1.49211 \quad v_5 = 57.66$
$r_9 = -6.725$
$\quad d_9 = 0.20$
$r_{10} = -12.114$
$\quad d_{10} = 1.00 \quad n_6 = 1.84666 \quad v_6 = 23.78$
$r_{11} = 14.500$ -continued

Embodiment 5

$\quad d_{11} = 7.13 \quad n_7 = 1.60311 \quad v_7 = 60.68$
$r_{12} = -9.935$
$\quad d_{12} = 0.20$
$r_{13} = 11.269$
$\quad d_{13} = 3.79 \quad n_8 = 1.72916 \quad v_8 = 54.68$
$r_{14} = 306.843$
$\quad d_{14} = 9.00$
$r_{15} = \infty$ (eye point)

aspherical surface coefficient (8th surface)

$K = 0, E = 0.12095 \times 10^{-2}, F = 0.36973 \times 10^{-4}$
$G = 0.85816 \times 10^{-6}$
$f_E/|r_{n1}| = 0.75, f_E/|r_{n1}| + f_E/|r_{n2}| = 1.37$
$f_{123}/f_E = 3.19, f_0/f_E = 7.81, L/f_E = 0.19$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

The aspherical surface used in the eyepiece system according to the present invention has a surface expressed, on an x-y-z coordinates system, by a general formula shown below:

$$z = \frac{S^2/r}{1 + \sqrt{1 - (K+1)(S/r)^2}} + ES^4 + FS^6 + \ldots$$

wherein a direction along an optical axis is taken as the z axis, an intersection between the aspherical surface and the z axis is taken as an origin, the reference symbol r represents a radius of curvature on a reference sphere of the aspherical surface, and the reference symbols $K, E, F, \ldots$ designate aspherical surface coefficients, and $S^2 = x^2 + y^2$.

Figure 3:
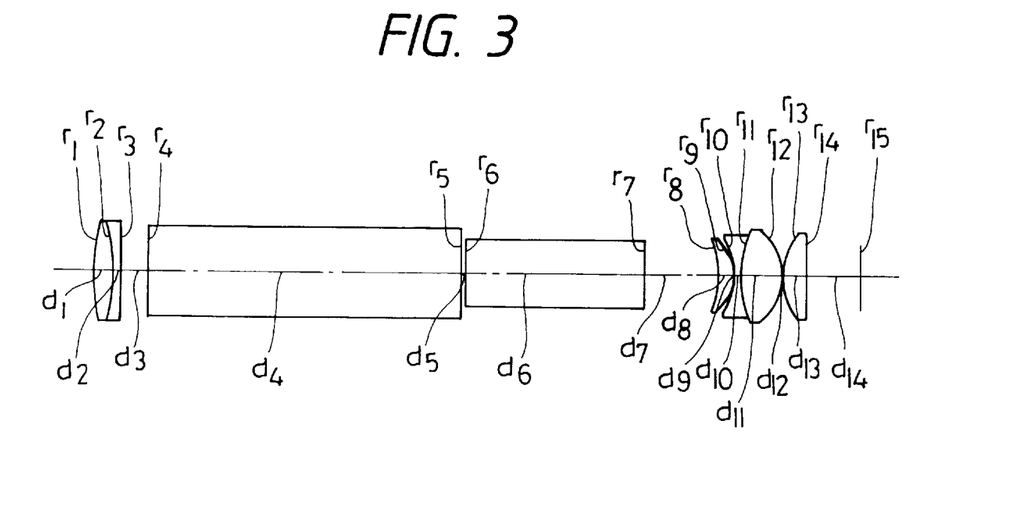
FIG. 3 shows a sectional view illustrating a composition of third through fifth embodiments of the eyepiece system according to the present invention.
Figure 4:
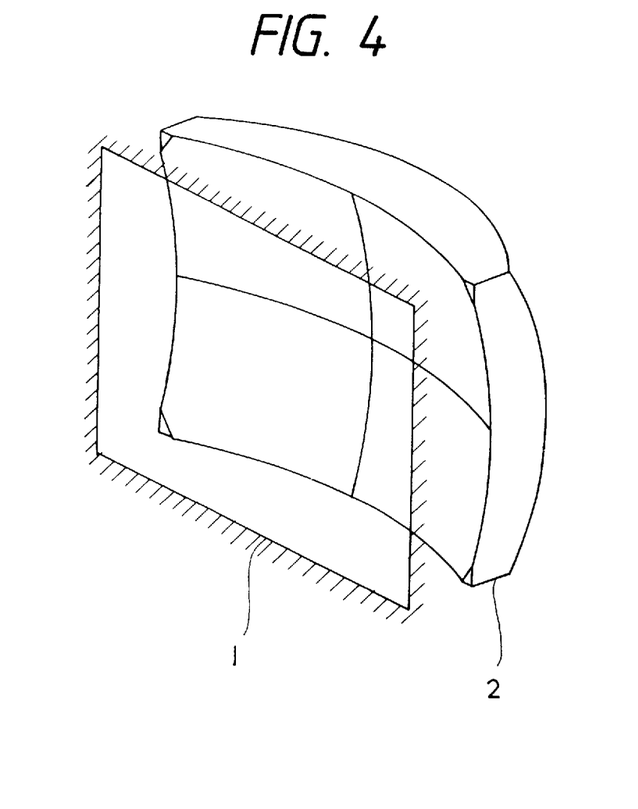
FIG. 4 shows a perspective view illustrating an external form of a lens element disposed on the object side in the eyepiece system according to the present invention.

A first embodiment is an eyepiece system having a composition illustrated in FIG. 3 and a second embodiment is an eyepiece system having a composition shown in FIG. 4, whereas third, fourth and fifth embodiments are eyepiece systems each of which has a composition illustrated in FIG. 3.

It is desirable that the eyepiece system according to the present invention is configured so as to have an external form having a vertical size and a horizontal size which are different from each other as described above.

FIG. 4 is a perspective view illustrating only the lens element of the eyepiece system which is disposed on the side of the objective lens system and a visual field frame. In this drawing, a reference numeral 1 represents the visual field frame which determines a visual frame and a reference numeral 2 designates the lens element of the eyepiece system which is disposed on the side of the objective lens system. The lens element 2 is made of a synthetic resin optical material, and has radii of curvature, thickness, refractive index and an Abbels number specified, for example, in the numerical data of the first embodiment or the second embodiment. Though the other lens elements of the eyepiece system are not shown in FIG. 4, these lens elements have, for example, the numerical data of the first embodiment or the second embodiment illustrated in FIG. 1 or FIG. 2.

The eyepiece system according to the present invention can have not only an external form having a vertical size and a horizontal size which are different from each other as illustrated in FIG. 4 but also other external forms which can be obtained by cutting off tops and bottoms of circular lens elements along lines in parallel with each other as required for holding the lens elements.

Further, a coating of $SiO_2$ or the like may be applied to the surface of the lens element disposed on the side of the objective lens system (the lens element 2 shown in FIG. 4) which is located on the side of the visual field frame for obtaining an antistatic effect and an anti-reflection effect.

The eyepiece system according to the present invention has a wide apparent field angle, permits favorable observation of images of objects and can be composed compactly of a small number of lens elements.

Further, the eyepiece system according to the present invention can be manufactured at a low cost while reserving favorable optical performance by selecting a synthetic resin material for the lens element which is to be disposed at the location nearest an objective lens system.

We claim:

1. An eyepiece for observation of an image formed by an objective lens system comprising, in order from a side of said objective lens system:

a first lens element which has at least a positive refractive power and at least one aspherical surface;

at least one negative lens element; and at least one positive lens element, wherein said first lens element satisfies the following condition:

$$N_{d1}<1.5,\ 62>\upsilon_{d1}>54$$

wherein the reference symbol $N_{d1}$ represents a refractive index of said first lens element and the reference symbol $\upsilon_{d1}$ designates an Abbe's number of said first lens element.

2. An eyepiece system comprising, in order from a side of an objective lens system, a first positive meniscus lens element having a convex surface on a side of an observer's eye, a cemented lens component consisting of a second biconcave lens element and a third biconvex lens element, and a fourth positive lens element.

3. An eyepiece system according to claim 2 wherein said fourth positive lens element has a convex surface on an objective lens side thereof with a curvature greater than a curvature of an observer's eye side surface of said first positive meniscus lens element.

4. An eyepiece system according to claim 2 or 3 satisfying the following condition (6):

$$(6)\ 0.1<f_E/|r_{n1}|<1.5$$

wherein the reference symbol $f_E$ represents a focal length of said eyepiece system and the reference symbol $r_{n1}$ designates a radius of curvature on a surface of said biconcave lens element which is located on the side of the objective lens system.

5. An eyepiece system for observation of an image formed by an objective lens system comprising, in order from a side of said objective lens system;

a first lens element having at least one aspherical surface and a concave surface on the side of said objective lens system;

a second biconcave lens element having a negative refractive power, a third biconvex lens element and a fourth single lens element which has a positive refractive power and a convex surface arranged such that a curvature of an objective lens side surface of said fourth lens element is greater than that of an eye side surface thereof, wherein said image formed by said objective lens system is formed on an objective lens side of said first lens element of said eyepiece; and said second lens element is cemented to said third lens element to form a cemented lens component.

6. An eye piece system according to claim 2 satisfying the following condition (2):

$$(2)\ 2.0<f_{123}/f_E<4.0$$

wherein $f_E$ represents a focal length of said eyepiece system, and $f_{123}$ designates a total focal length of said first positive meniscus lens element, said second biconcave lens element and said third biconvex lens element.

7. An eyepiece system according to claim 1 wherein said first lens element is made of a synthetic resin material.

8. An eyepiece system according to claim 7 wherein said first lens element has a size where a length in a horizontal direction is larger than a length in a vertical direction.

9. An eyepiece system according to claim 2 or 3 satisfying the following condition (6-1):

$$(6\text{-}1)\ 0.15<f_E/|r_{n1}|<0.5$$

wherein the reference symbol $f_E$ represents a focal length of said eyepiece system and the reference symbol $r_{n1}$ designates a radius of curvature on a surface of said second biconcave lens element which is located on the side of the objective lens system.

10. An eyepiece system according to claim 2 or 3 satisfying the following condition (6-2):

$$(6\text{-}2)\ 0.4<f_E/|r_{n1}|<1.2$$

wherein the reference symbol $f_E$ represents a focal length of said eyepiece system and the reference symbol $r_{n1}$ designates a radius of curvature on a surface of said second biconcave lens element which is located on the side of the objective lens system.

11. An eyepiece system according to claim 2 or 3 satisfying the following condition (6-3):

$$(6\text{-}3)\ 0.61<f_E/|r_{n1}|<1.0$$

wherein the reference symbol $f_E$ represents a focal length of said eyepiece system and the reference symbol $r_{n1}$ designates a radius of curvature on a surface of said second biconcave lens element which is located on the side of the objective lens system.

12. An eyepiece system according to claim 2 or 3 satisfying the following condition (7):

$$(7)\ 0.4<f_E/|r_{n1}|+f_E/|r_{n2}|<1.75$$

wherein the reference symbol $f_E$ represents a focal length of said eyepiece system, and the reference symbols $r_{n1}$ and $r_{n2}$ designate radii of curvature on an object side surface and an image side surface respectively of said second biconcave lens element.

13. An eyepiece system according to claim 2 or 3 satisfying the following condition (7-1):

$$(7\text{-}1)\ 0.7<f_E/|r_{n1}|+f_E/|r_{n2}|<1.2$$

wherein the reference symbol $f_E$ represents a focal length of said eyepiece system, and the reference symbols $r_{n1}$ and $r_{n2}$ designate radii of curvature on an object side surface and an image side surface respectively of said second biconcave lens element.

14. An eyepiece system according to claim 2 or 3 satisfying the following condition (7-2):

(7-2) $1.1 < f_E/|r_{n1}| + f_E/|r_{n2}| < 1.67$ wherein the reference symbol $f_E$ represents a focal length of said eyepiece system, and the reference symbols $r_{n1}$ and $r_{n2}$ designate radii of curvature on an object side surface and an image side surface respectively of said second biconcave lens element.

15. An eyepiece system for observation of an image formed by an objective lens system, comprising a plurality of lens elements, wherein a lens element of said plurality of lens elements is disposed on [a] an objective lens side, is made of a synthetic resin material and has a positive refractive power, and the following condition (3) is satisfied:

(3) $2 < f_0/f_E$ wherein the reference symbol $f_0$ represents a focal length of said objective lens system and the reference symbol $f_E$ designates a focal length of said eyepiece system, and a surface of the lens element made of said synthetic resin material has a coating that is an antistatic and antireflection coating.

* * * * *